United States Patent
Uehori

(10) Patent No.: US 9,244,892 B2
(45) Date of Patent: Jan. 26, 2016

(54) INFORMATION DISPLAY APPARATUS AND COMPUTER READABLE MEDIUM

(75) Inventor: Yukiyo Uehori, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 785 days.

(21) Appl. No.: 12/869,449

(22) Filed: Aug. 26, 2010

(65) Prior Publication Data

US 2011/0179343 A1 Jul. 21, 2011

(30) Foreign Application Priority Data

Jan. 15, 2010 (JP) .................................. 2010-006342

(51) Int. Cl.
*G06F 17/00* (2006.01)
*G06F 17/21* (2006.01)
*G06F 17/30* (2006.01)
*G06T 11/60* (2006.01)
*G06F 3/0484* (2013.01)

(52) U.S. Cl.
CPC ........ *G06F 17/212* (2013.01); *G06F 17/30011* (2013.01); *G06T 11/60* (2013.01); *G06F 3/04842* (2013.01)

(58) Field of Classification Search
CPC .............. G06F 17/212; G06F 3/03842; G06F 17/30011
USPC ......................................................... 715/201
See application file for complete search history.

(56) References Cited

U.S. PATENT DOCUMENTS

| 7,836,406 | B1* | 11/2010 | Kirsten et al. ................. 715/777 |
| 8,095,888 | B2* | 1/2012 | Jang et al. ...................... 715/801 |
| 2002/0007369 | A1* | 1/2002 | Saravanan ................... 707/501.1 |
| 2002/0069223 | A1* | 6/2002 | Goodisman et al. .......... 707/513 |
| 2006/0212816 | A1* | 9/2006 | Koskimies ..................... 715/744 |
| 2007/0130525 | A1* | 6/2007 | Murphy et al. ................ 715/747 |
| 2007/0162865 | A1 | 7/2007 | Haynes et al. |
| 2007/0266342 | A1* | 11/2007 | Chang et al. ................... 715/810 |
| 2008/0065982 | A1* | 3/2008 | Evanchik et al. ............. 715/255 |
| 2008/0168388 | A1* | 7/2008 | Decker ......................... 715/800 |

FOREIGN PATENT DOCUMENTS

| JP | 4-97420 A | 3/1992 |
| JP | 5-342408 A | 12/1993 |
| JP | 9-512933 A | 12/1997 |
| JP | 2000-105653 A | 4/2000 |
| JP | 2001-142603 A | 5/2001 |
| JP | 2007-183936 A | 7/2007 |
| WO | 95/30951 A1 | 11/1995 |

* cited by examiner

*Primary Examiner* — Amelia Tapp
(74) *Attorney, Agent, or Firm* — Sughrue Mion, PLLC

(57) ABSTRACT

An information display apparatus that includes a judgment unit that, in the even of receiving the input of the position coordinate through the operation unit while one page of the image data is being displayed on the display screen, judges which area is selected from areas in the page being displayed on the display screen on the basis of the received position coordinate; and a display controller that displays an image of a first area which is determined to be selected by the judgment unit with remaining the position when the area is indicated through the operation unit, hides an image of the area other than the first area, and display an image of next page of the page being displayed in an area where then image of the area other than the first area is hidden.

10 Claims, 12 Drawing Sheets

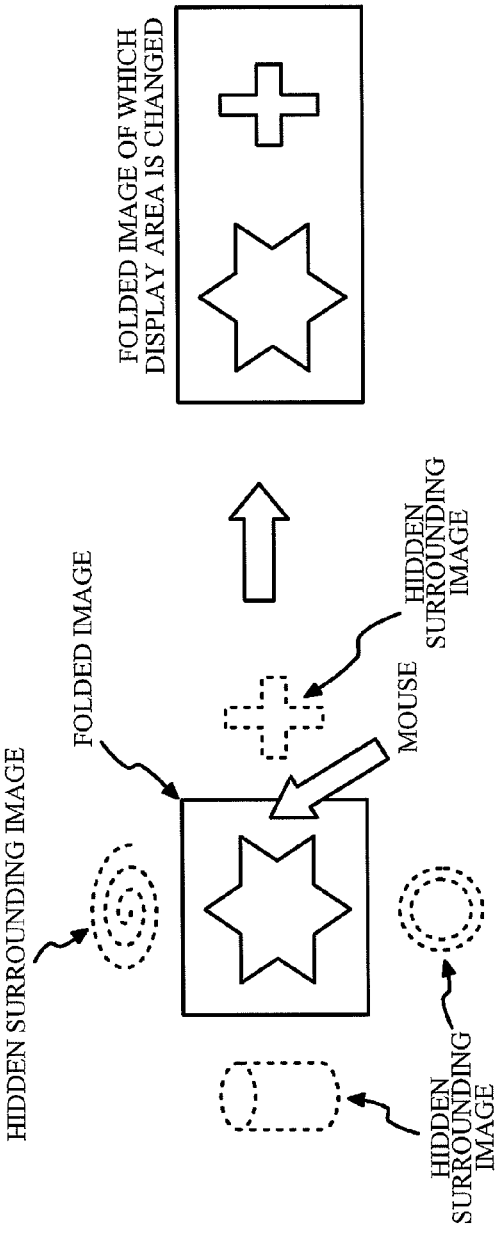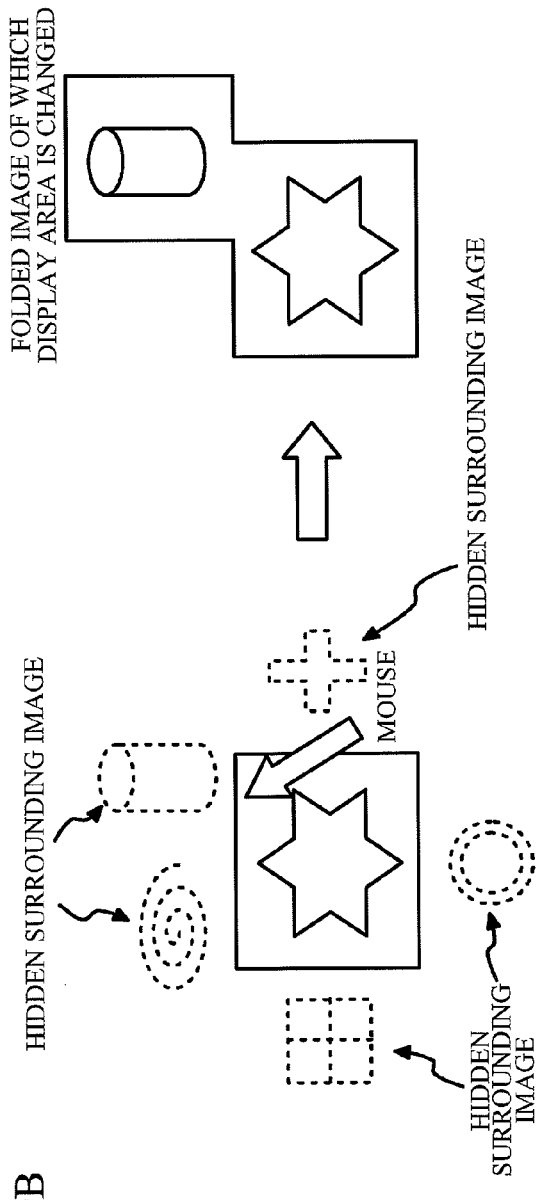

INFORMATION DISPLAY APPARATUS AND COMPUTER READABLE MEDIUM

CROSS-REFERENCE TO RELATED APPLICATION

This application is based on and claims priority under 35 USC 119 from Japanese Patent Application No. 2010-006342 filed on Jan. 15, 2010.

BACKGROUND (i) Technical Field

The present invention relates to an information display apparatus and a computer readable medium.

(ii) Related Art

Various methods of displaying information on the computer screen have been proposed.

SUMMARY

According to an aspect of the present invention, there is provided an information display apparatus including: an area separation unit that analyzes each page of pages included in an image data, determines whether at least one of character, graphic and picture is included in each page included in the image data, and separates each page included in the image data into each area of character, graphic and picture determined to be included; an operation input reception unit that receives an input of a position coordinate that is indicated through an operation unit that receives an operation to indicate an arbitrary position on a display screen; a judgment unit that, when the input of the position coordinate through the operation unit is received while one page included in the image data is being displayed on the display screen, judges which area is selected from areas included in the page being displayed on the display screen on the basis of the position coordinate that is received; and a display controller that displays an image of a first area which is determined to be selected by the judgment unit with maintaining the position when the area is indicated through the operation unit, hides an image of the area other than the first area, and displays an image of a next page of the page being displayed in an area where the image of the area other than the first area is hidden.

BRIEF DESCRIPTION OF THE DRAWINGS

Exemplary embodiments of the present invention will be described in detail based on the following figures, wherein:

FIG. 5A illustrates a state where a partial area is selected, and FIG. 5B is a diagram illustrating an area to be deleted first with hatching;

FIG. 6A is a diagram illustrating a state where the area to be deleted first is deleted, and FIG. 6B is a diagram illustrating the area to be deleted secondarily with hatching;

FIG. 7A is a diagram illustrating a state where the area to be deleted secondarily is deleted, and FIG. 7B is a diagram illustrating a state where the area to be deleted third is deleted;

FIG. 8A is a diagram illustrating a selection of the image to be newly displayed by the mouse operation, and FIG. 8B is a diagram illustrating a folded image that is newly displayed after adding the selected image;

FIGS. 9A and 9B are diagrams for explaining an exemplary method of selecting an image to be newly displayed by the mouse operation;

DETAILED DESCRIPTION

A description will now be given, with reference to the accompanying drawings, of exemplary embodiments of the present invention.

Figure 1:
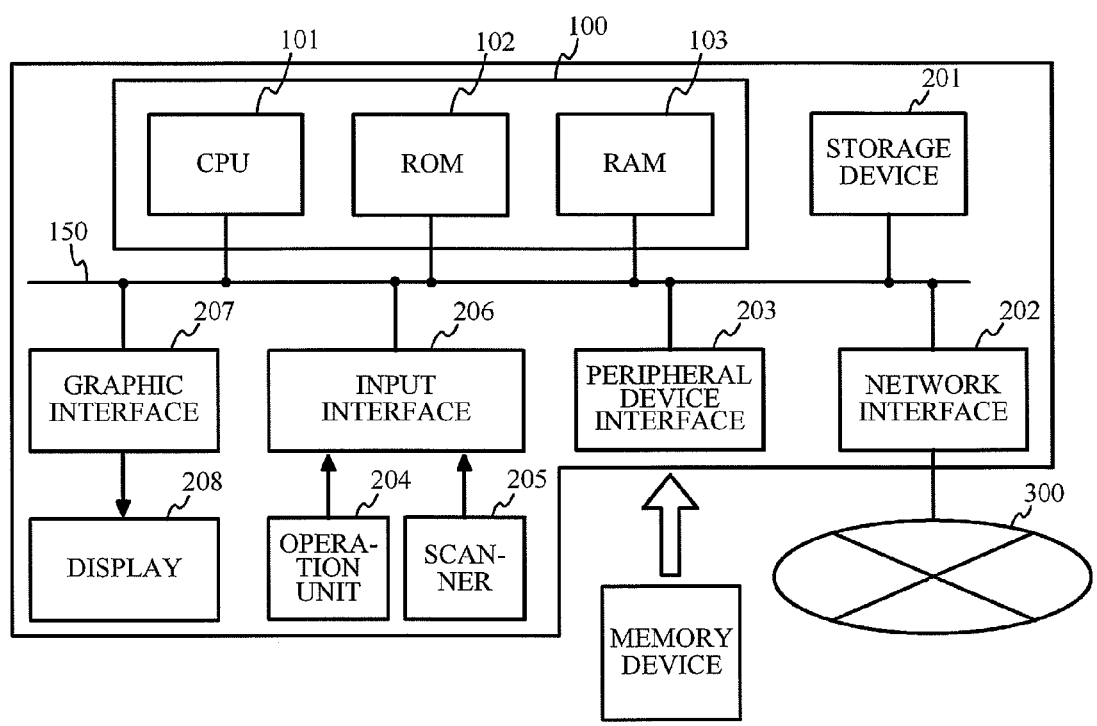
FIG. 1 is a diagram illustrating the composition of a computer apparatus.

A description will now be given of the composition of an exemplary embodiment of a computer apparatus to which the present invention is applied, with reference to FIG. 1. A computer apparatus 1 illustrated in FIG. 1 is provided with a controller 100, a storage device 201, a network interface 202, a peripheral device interface 203, an operation unit 204, a scanner 205, an input interface 206, a graphic interface 207 and a display 208. The controller 100, the storage device 201, the network interface 202, the peripheral device interface 203, the input interface 206 and the graphic interface 207 are coupled to an internal bus 150.

The controller 100 controls the display 208 to display document data and image data stored in the storage device 201 according to the control by the control program described later. Details of the display control by the controller 100 will be described later.

The controller 100 is provided with a CPU (Central Processing Unit) 101, a ROM (Read Only Memory) 102, and a RAM (Random Access Memory) 103 as hardware components. The ROM 102 stores control programs that the CPU 101 uses for the control. When the CPU 101 is started up, it reads control programs from the ROM 102, and stores them to the RAM 103. The CPU 101 executes processing according to the program stored in the RAM 103. The RAM 103 functions as a work memory of the CPU 101, and stores data used for calculation by the CPU 101. Functional blocks achieved by cooperation between the hardware such as the CPU 101 and RAM 103 and the programs stored in the ROM 102 will be described later with reference to FIG. 2.

The storage device 201 is a storage device such as a hard disc drive. The storage device 201 stores document data and image data transmitted from external devices coupled to a network 300, document data and image data created by the computer apparatus 1, document data and image data read from the storage device such as a USB (Universal Serial Bus) memory, and image data read by the scanner 205.

The network interface 202 is a communication interface for communicating with external devices coupled to the network 300 such as LAN (Local Area Network). The network interface 202 receives document data and image data transmitted from external devices such as a personal computer and image forming apparatus coupled to the network 300, and transmits received document data and received image data to the controller 100. The controller 100 sends document data and image data, transmitted from the network interface 202, to the storage device 201, and stores them in the storage device 201.

The peripheral device interface 203 functions as an interface with a storage device such as a USB memory and SD memory card. The peripheral device interface 203 reads document data and image data stored in the storage device coupled to the peripheral device interface 203, and transmits the read document data and image data to the controller 100. The controller 100 sends document data and image data, transmitted from the peripheral device interface 203, to the storage device 201, and stores them in the storage device 201. Document data and image data received by the network interface 202 and the peripheral device interface 203 may be sent to the storage device 201 directly from the network interface 202 and the peripheral device interface 20, and stored in the storage device 201 without being transmitted to the controller 100.

The operation unit 204 includes an input device such as a keyboard and a mouse. The input interface 206 receives operation information inputted by using the operation unit 204, and transmits the received operation information to the controller 100. The controller 100 changes display information displayed on the display 208 according to the operation information received by the input interface 206.

The scanner 205 reads images formed on the paper which is placed on the platen (not illustrated), and transmits read image data to the controller 100 through the input interface 206. The controller 100 sends the image data received through the input interface 206 to the storage device 201, and stores them in the storage device 201.

The graphic interface 207 is an interface to display graphic data processed by the controller 100 on the display 208. The graphic interface 207 converts the graphic data to wave-shaped electrical signals to display it on the display 208.

Figure 2:
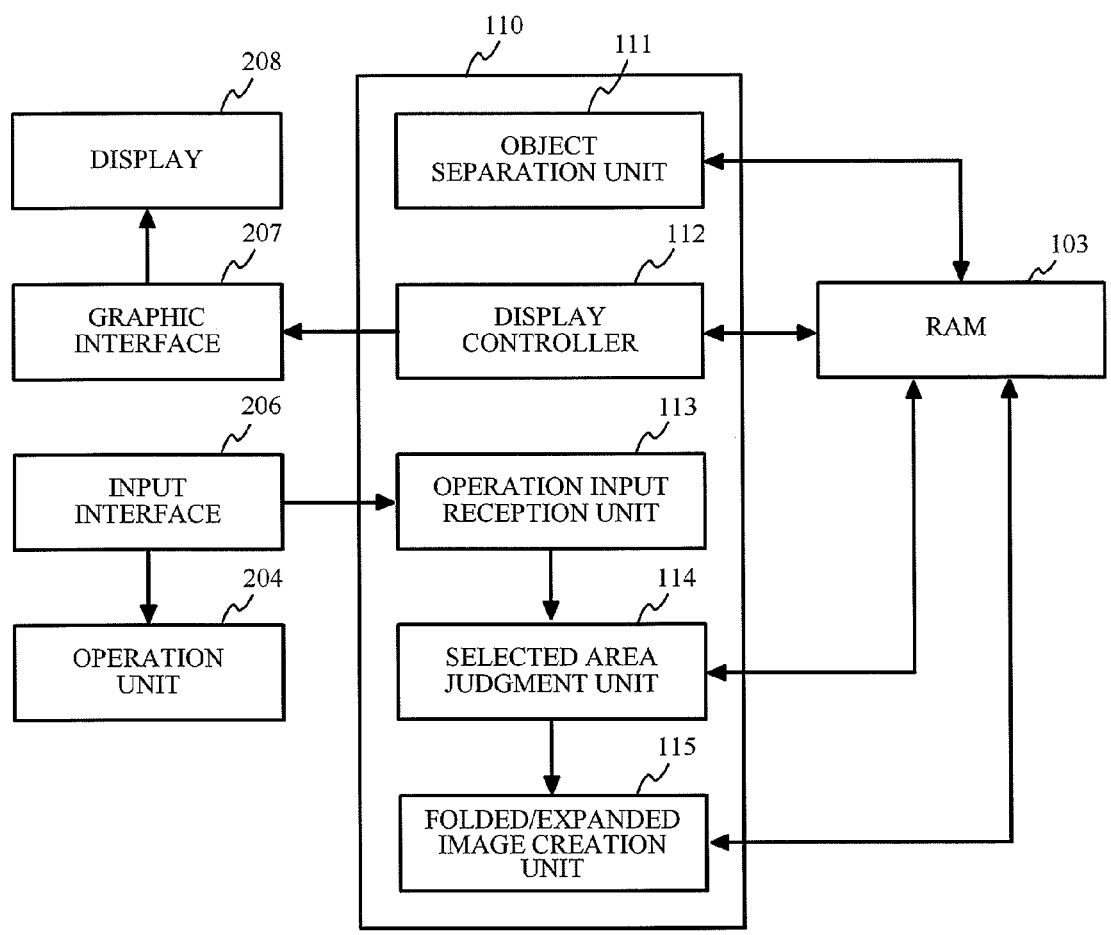
FIG. 2 is a diagram illustrating the composition of functional blocks of a controller.

A description will now be given of functional blocks of the controller 100 with reference to FIG. 2. A functional block represents a block of a certain function composed of processes achieved by the cooperation between hardware such as the CPU 101 and RAM 103 provided to the controller 100 and programs stored in the ROM 102. The controller 100 includes an object separation unit 111, a display controller 112, an operation input reception unit 113, a selected area judgment unit 114 and a folded/expanded image creation unit 115 as a functional block 110.

The object separation unit 111 reads image data stored in the RAM 103, and determines whether characters, graphics or pictures are included in the read image data. Various methods of determining characters, graphics and pictures are suggested, and Japanese Patent Application Publication No. 05-342408 discloses an exemplary method. When the object separation unit 111 determines that at least one of characters, graphics and pictures is included in image data, it determines a range where characters, graphics, or pictures exist within the image data, and stores coordinate values, which indicate the determined range where characters, graphics or pictures exist (hereinafter, referred to as the character area, the graphic area and the picture area respectively), in the RAM 103. For example, when the character area is a quadrangular area, coordinate values of four vertex of the quadrangle are stored in the RAM 103. The coordinate origin can be set to the upper left of image data and document data for example as illustrated in FIG. 3B.

Figure 3A:
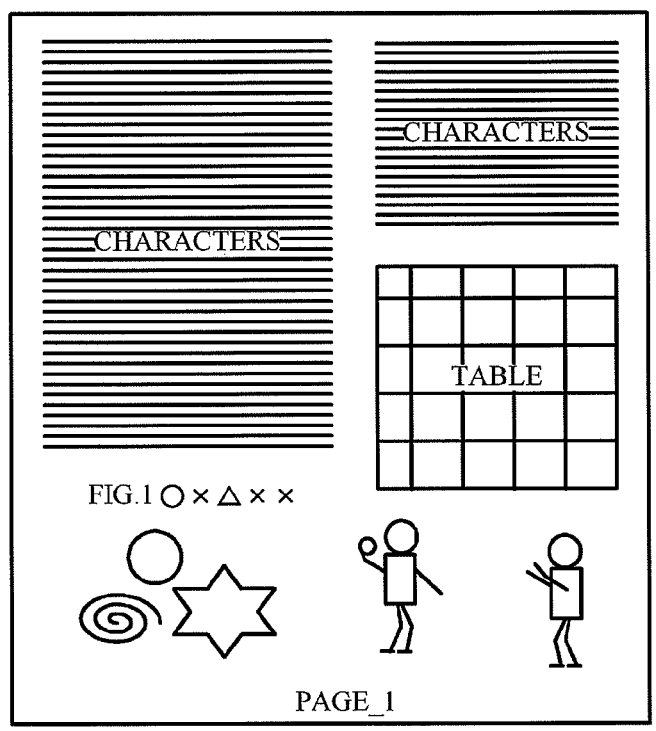
FIG. 3A is a diagram illustrating image data read to an object separation unit.
Figure 3B:
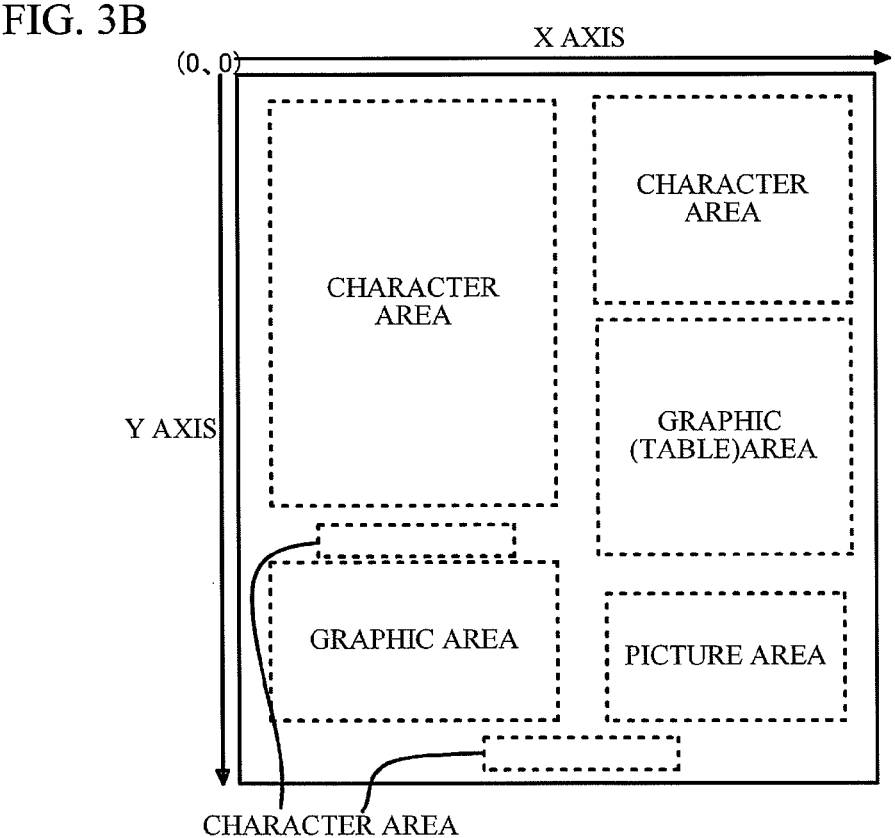
FIG. 3B is a diagram illustrating a processing result by the object separation unit.

FIG. 3A illustrates an example of image data that the object separation unit 111 reads from the RAM 103. FIG. 3B illustrates a result of separating read image data into the character area, the graphic area and the picture area after the object separation unit 111 identifies characters, graphics and pictures included in read image data. Hereinafter, when the character area, the graphic area and the picture area are referred to collectively, they are referred to as the partial area. As characters, pictures, and graphics are included in the image data illustrated in FIG. 3B, the image data is separated into the character area, the graphic area and the picture area. However, image data only including characters, and image data only including graphics or pictures are object for processing. When such image data is processed by the object separation unit 111, the separated area may be the character area alone, or the graphic and picture areas without the character area. As the image data is separated into the character area, the graphic area and the picture area according to the rule to make a certain group, image data will be separated into multiple character areas, graphic areas and picture areas in the case that image data for one page includes multiple character areas, graphic areas and picture areas.

In a case that data read from the RAM 103 is not image data but document data created by the word-processing software (e.g. document data described in Page Description Language (PDL)), the object separation unit 111 analyzes document data, and determines whether at least one of the character area, the graphic area and the picture area is included. As same with the case of image data, the object separation unit 111 determines a range of the character area, graphic area and picture area, which are determined to be included, in image data created on the basis of document data, and stores coordinate values indicating the determined range to the RAM 103.

Figure 4A:
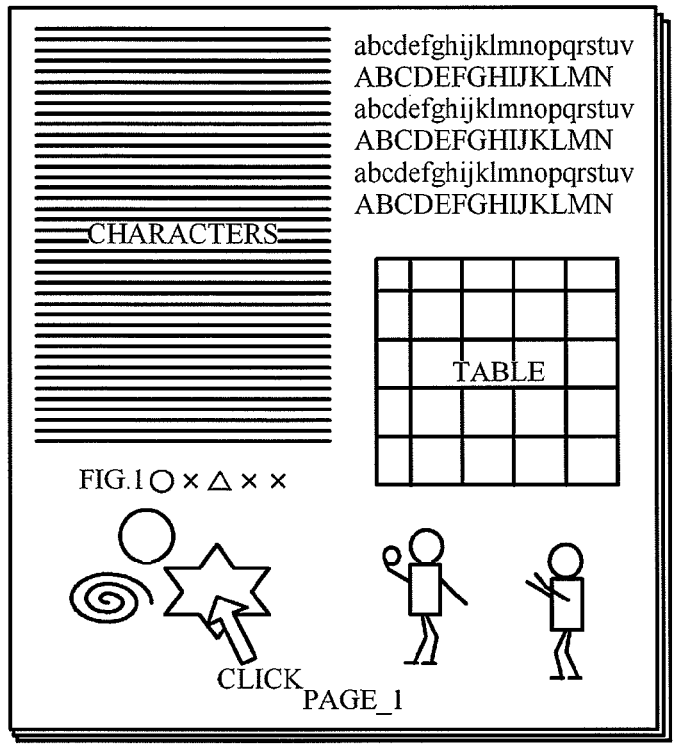
FIG. 4A is a diagram illustrating an image displayed on a display.

The display controller 112 reads out document data and image data stored in the RAM 103, and displays them on the display 208 through the graphic interface 207. FIG. 4A illustrates an image displayed on the display 208. Image data is image data including multiple pages. Document data and image data that the display controller 112 displays on the display 208 include partial areas such as the character area, the graphic area and the picture area included in image data and document data as well as document data and image data for one page. The controller 100 reads out document data and image data from the storage device 201 and preliminarily stores them to the RAM 103, when displaying document data and image data on the display 208.

The operation input reception unit 113 receives operation information inputted through the operation unit 204, for example the position coordinate on the display 208 according to the input through the mouse, and sends the received operation information to the selected area judgment unit 114.

The selected area judgment unit 114 judges which partial area is selected from partial areas separated by the object separation unit 111 by the user on the basis of the operation information received by the operation input reception unit 113. The selected area judgment unit 114 sends and stores the judgment result to the RAM 103, and sends the judgment result to the folded/expanded image creation unit 115.

The selected area judgment unit 114 informs the folded/expanded image creation unit 115 about the image to be displayed in addition to the folded image being displayed when the particular area of the folded image is selected through the operation unit 204 in the state where the folded image described later is displayed on the display 208.

The folded/expanded image creation unit 115 obtains the partial area selected through the operation unit 204 from the selected area judgment unit 114. The folded/expanded image creation unit 115 obtains image data or document data that is being displayed or is to be displayed on the display 208 from the RAM 103.

The folded/expanded image creation unit 115 creates image data or document data in which the area other than the partial area selected through the operation unit 204 in image data or document data read from the RAM 104 is deleted (folded), on the basis of the judgment result by the selected area judgment unit 114. Hereinafter, image data or document data in which the area other than the partial area selected through the operation unit 204 is deleted (folded) is referred to as the folded image data. The image of the folded image data displayed on the display 208 is simply referred to as the folded image. The folded/expanded image creation unit 115 stores the created folded image data to the RAM 103.

Figure 4B:
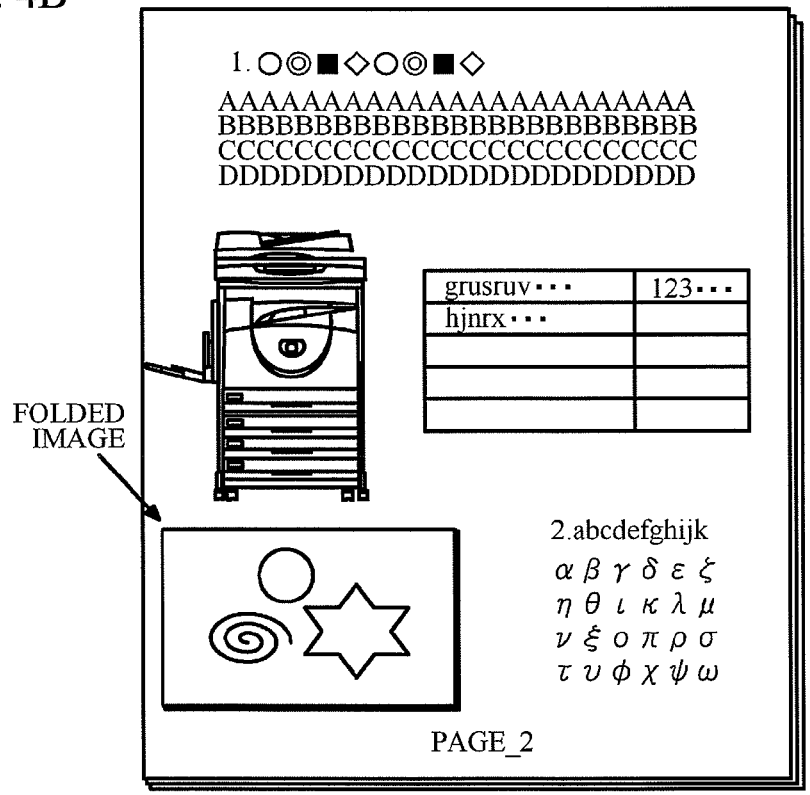
FIG. 4B is a diagram illustrating a folded image.

FIG. 4A illustrates an image of PAGE_1 which is not folded yet and is displayed on the display 208 by the display controller 112. FIG. 4B illustrates a state where the folded image that the display controller 112 displays on the display 208 and the image of the next page of the folded image are overlapping. The folded image can be moved to arbitrary position on the display screen of the display 208 by a drag and drop operation of a mouse.

The folded image is displayed on the display with the anteroposterior relation between pages as illustrated FIG. 4B. In the area where the folded image and the image of the next page of the folded image are overlapping, the folded image is displayed over the image of the next page. To show that the folded image is above the image of the next page, it is possible to display the shade of the folded image on the image displayed below the folded image. As obvious by comparing between FIG. 4A and FIG. 4B, the folded image is displayed on the display screen with the position of the folded image in the image data being maintained. This means that the display position of the folded image that displays only the image of the selected partial area is same as the display position of the selected partial area in the image where the area other than the selected partial area is not deleted yet. Thus, the selected partial area is displayed as the folded image at the position where it is not necessary for the user to change the viewpoint.

In a case that the image data is the image data including multiple pages, the partial area in the image data including multiple pages is selected through the operation unit 204, and that the partial area of which the page number is small overlaps with the partial area of which the page number is large, the partial area of which the page number is small is displayed in the overlapping area. Thus, the image of the selected partial area is displayed with the page order being maintained.

When the folded image data is displayed on the display 208, the display may be switched from the image data that is not folded yet to the folded image data at one time. It is possible to display how the image data is folded in given order at given duration. The process to fold the image data will be described with reference to FIGS. 5A through 7B.

Figure 5A:
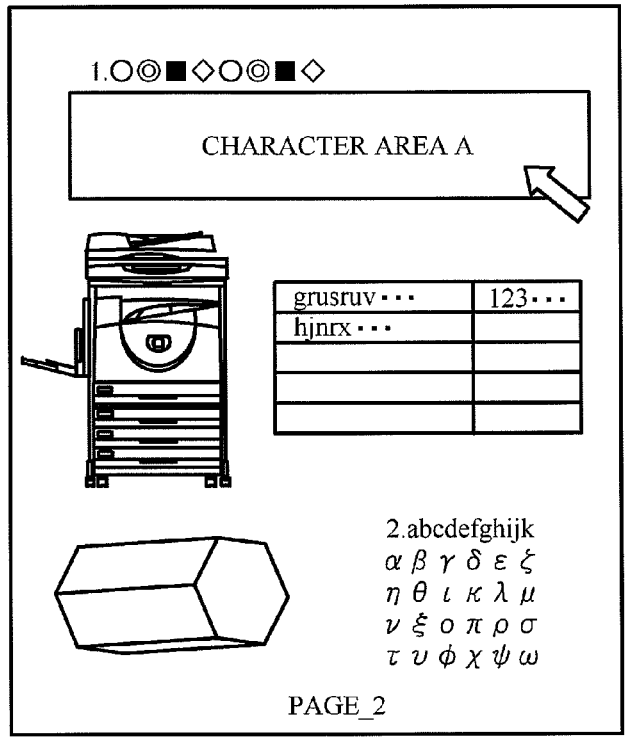
FIG. 5A and FIG. 5B are diagrams for explaining an exemplary process to display a folded image on the display.
Figure 5B:
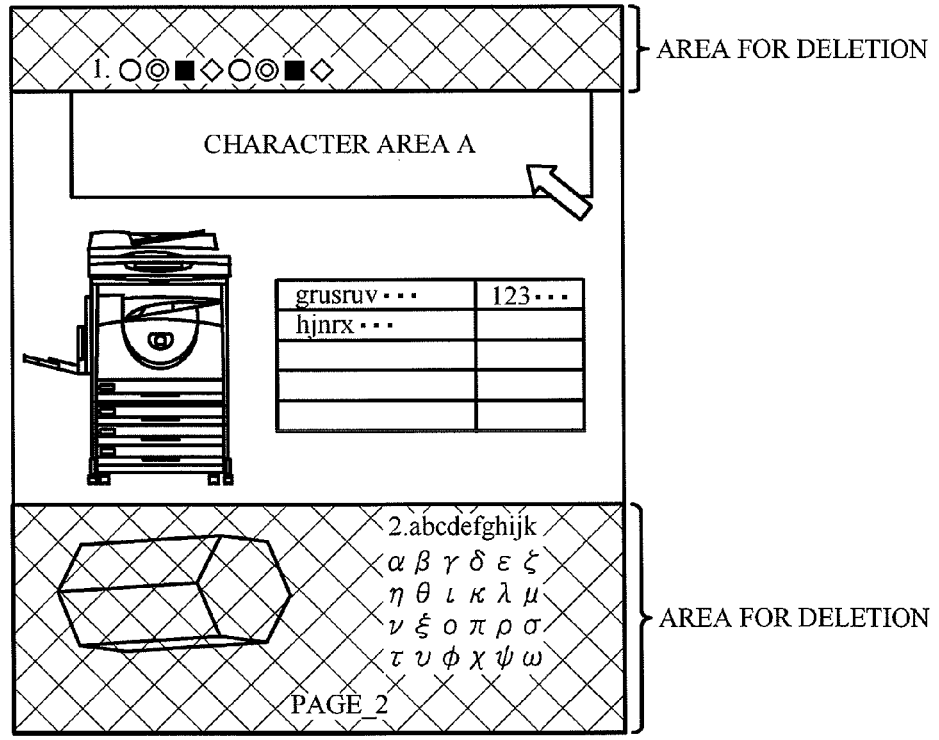
Figure 6A:
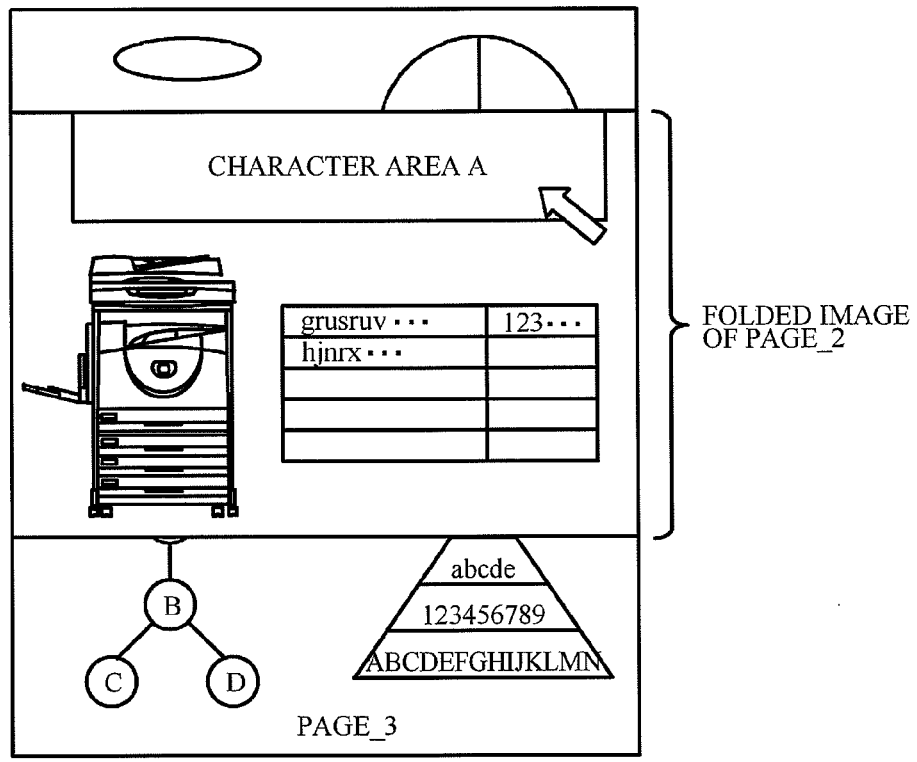
FIGS. 6A and 6B are diagrams for explaining an exemplary process to display a folded image on the display.

For example, the partial area A (hereinafter, referred to as the character area A) illustrated in FIG. 5A is selected by the user. In this case, the controller 100 creates the folded image in which all partial area lying above the selected character area A and the partial area lying below the character area A and not contacting with the character area A are deleted (folded), and displays it on the display 208. In FIG. 5B, the partial area which is planned to be deleted (folded) is illustrated with hatching. In FIG. 6A, the folded image where the partial area planned to be deleted (folded) is deleted is illustrated. In FIG. 6A, the image of the next page is displayed below the deleted image.

Figure 6B:
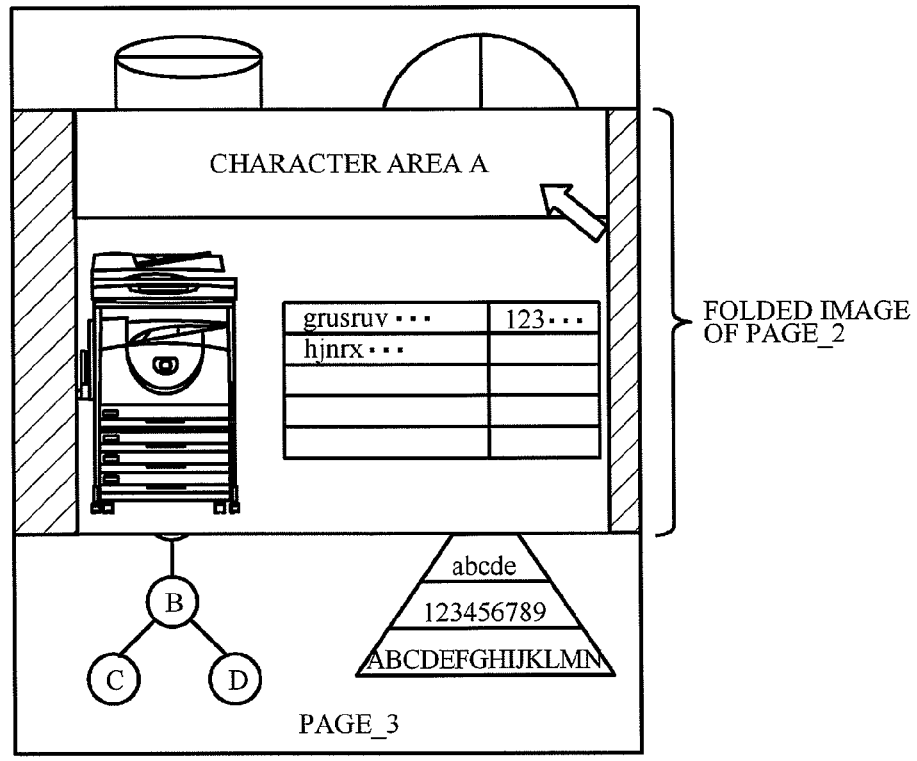
Figure 7A:
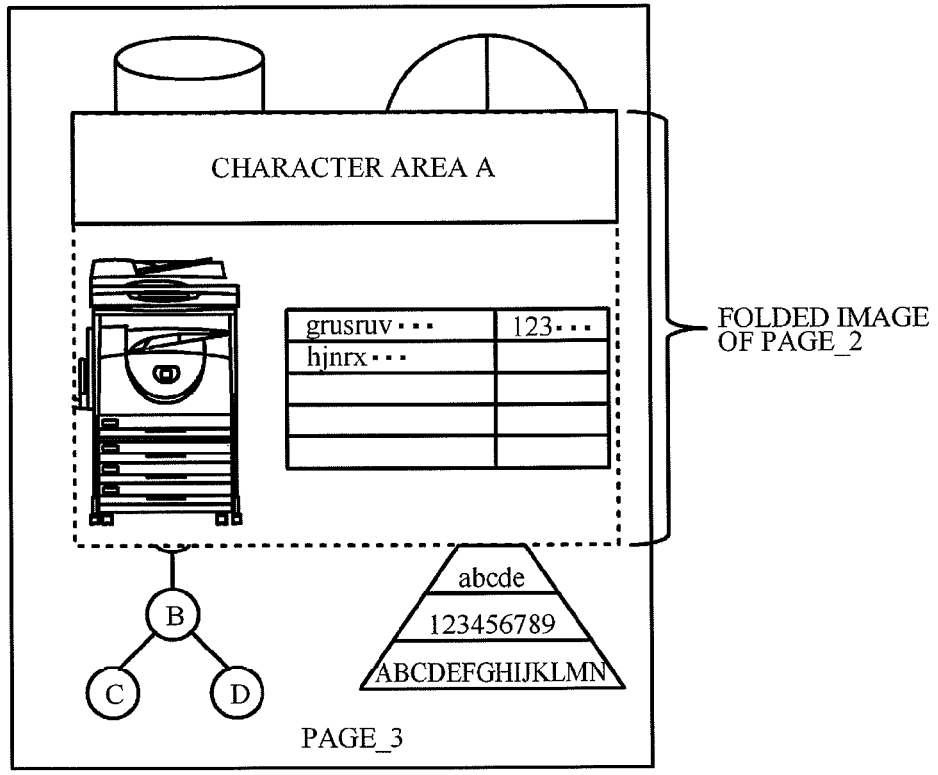
FIGS. 7A and 7B are diagrams for explaining an exemplary process to display a folded image on the display.

The controller 100 plans to delete the area on both sides of the character area A, creates the folded image where the area on both sides of the character area A is deleted (folded), and displays it on the display 208. FIG. 6B illustrates the area on both sides of the character area A planned to be deleted with hatching. FIG. 7A illustrates the folded image where the area on both sides of the character area A is deleted.

Figure 7B:
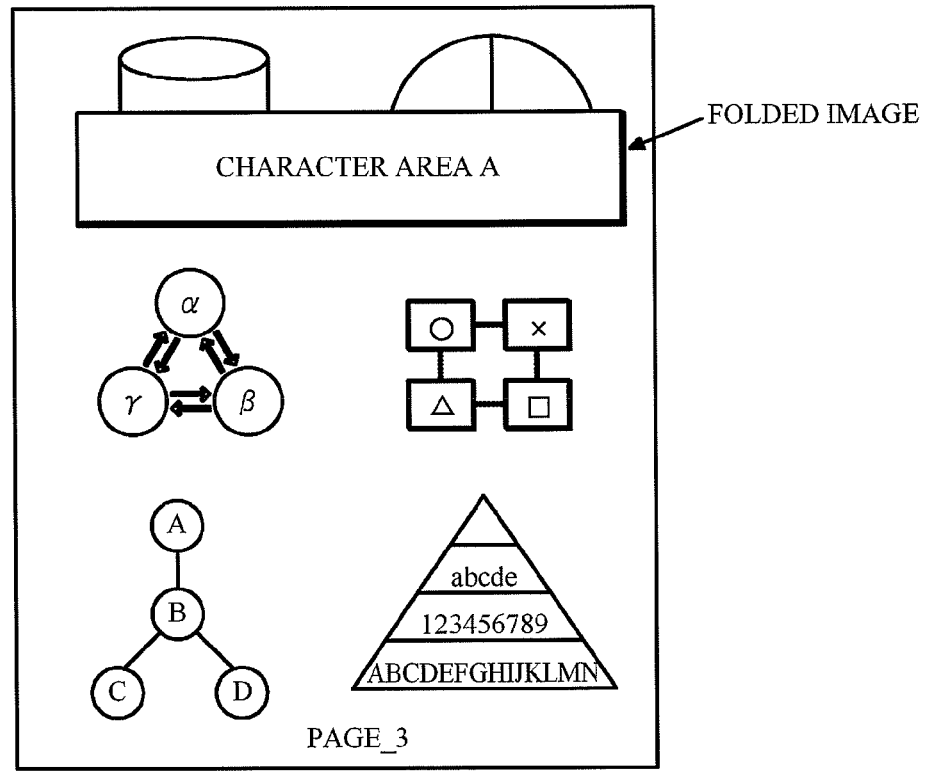

The controller 100 creates the folded image where the adjacent area below the character area A is deleted (folded), and displays it on the display 208. FIG. 7B illustrates the folded image where all the areas other than the character area A are deleted (folded).

The description will now be given of the process of changing the display range of the image displayed on the display 208 as the folded image.

Figure 8A:
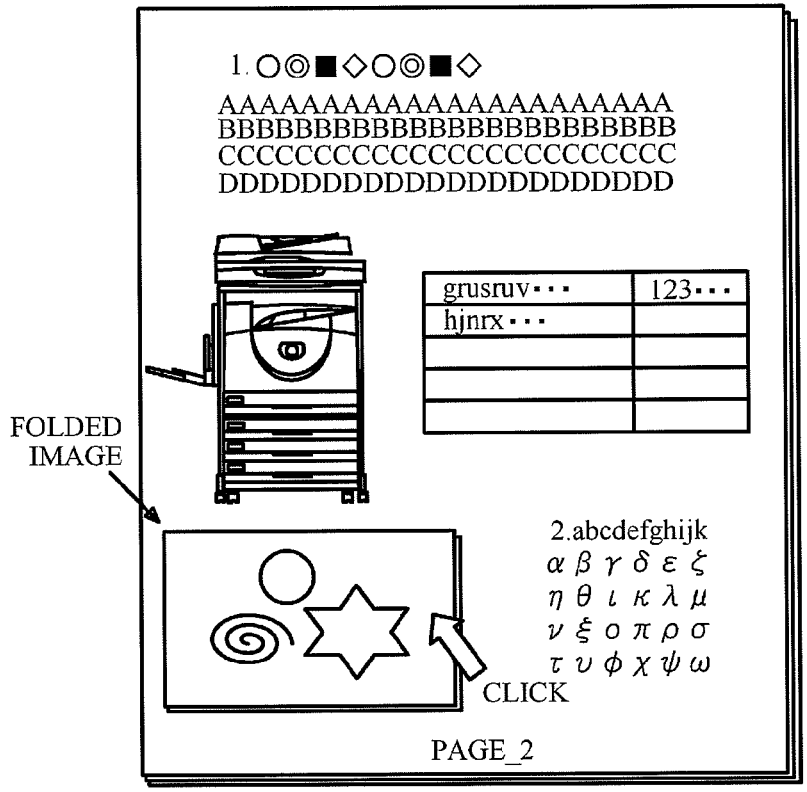
FIGS. 8A and 8B are diagrams for explaining an exemplary process to change the display range of the folded image.

The process of changing the display range of the folded image means, in the event that the particular area of the folded image is selected by the user operation with a mouse in a state where the folded image is being displayed as illustrated in FIG. 8A, the process of changing the display range of the folded image according to the selected particular area.

Figure 8B:
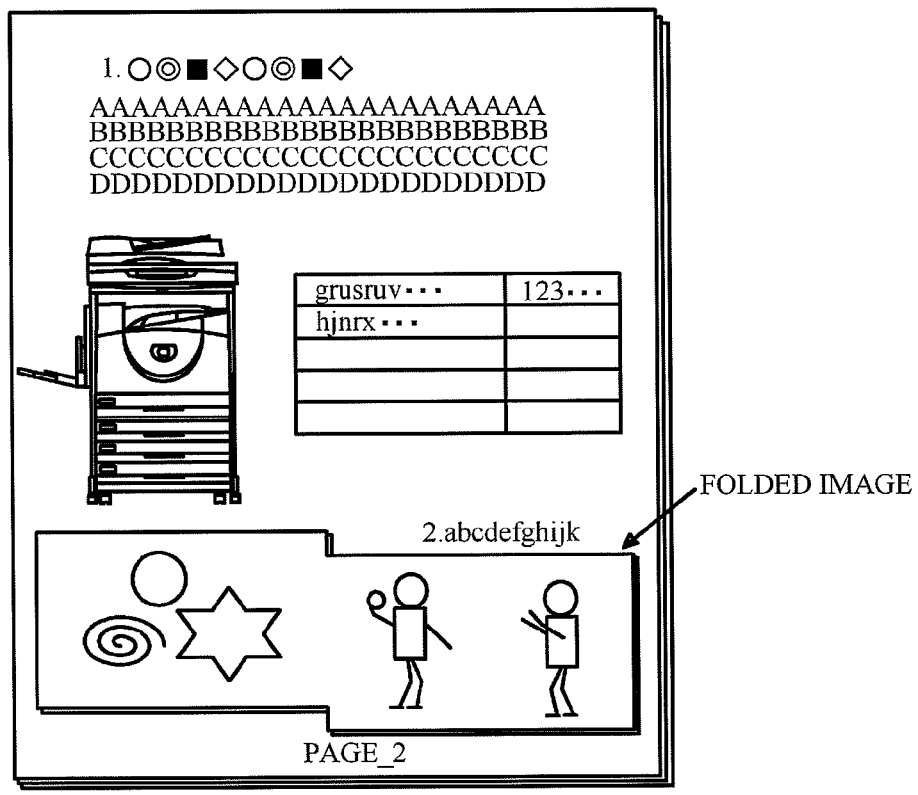

For example, when the right end area of the folded image is selected through the mouse, the folded image where the image locating on the right side of the folded image is newly displayed is displayed as illustrated in FIG. 8B. The image newly displayed is the image of the page same as the image already being displayed as the folded image in FIG. 8A, which means the image locating on the right side of the image already being displayed as the folded image.

In the same manner, when the area on the upper side of the folded image is selected by the mouse, the folded image where the image which is the image of the page same as the image already being displayed as the folded image and is locating on the upper side of the image already being displayed as the folded image is newly displayed is displayed.

The image selected by the mouse operation and newly displayed is changed according to the positional relation between the image already being displayed as the folded image and the surrounding image thereof. FIG. 9A illustrates the folded image and the surrounding image thereof at the same page. Surrounding images are illustrated with dashed line to express that they are hidden on the display 208. As illustrated in FIG. 9A, when there are four images (characters, graphics or pictures), that are locating on the left, right, top and bottom of the image being displayed as the folded image, the folded image where the image according to the selected position is newly added is displayed when the edge portion on the left, right, top and bottom of the folded image is selected. As illustrated in FIG. 9B, when there are two images above the image being displayed as the folded image, if the right side of the top end portion of the folded image is selected by the mouse, the image locating at the upper right of the image being displayed as folded image is newly displayed. When the left side of the top end portion of the folded image is selected by the mouse, the image locating at the upper left of the image being displayed as the folded image is newly displayed.

When generating the folded image by combining multiple partial areas which are selected, there are two methods of setting the display area of the folded image to be created.

Figure 10A:
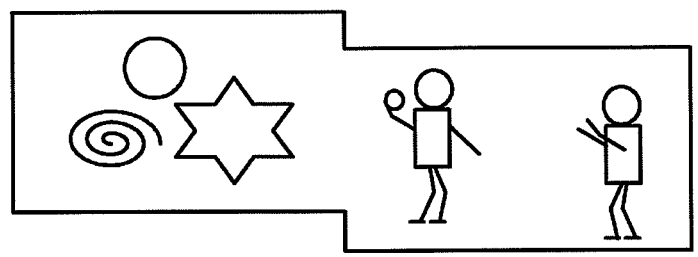
FIG. 10A illustrates a case when setting a display area of the folded image by a polygon with minimum area covering selected partial areas.
Figure 10B:
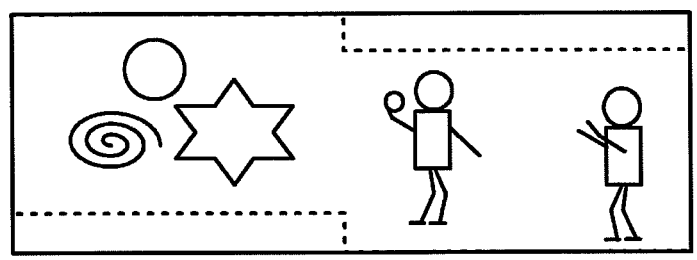
FIG. 10B illustrates a case when setting a display area of the folded image by a quadrangle covering selected partial areas.

Firstly, as illustrated in FIG. 10A, the display area of the folded image can be set with a polygon with minimum area covering all selected partial areas. Secondly, as illustrated in FIG. 10B, the display area of the folded image can be set with a quadrangle covering all selected partial areas. Both display areas can be set for the folded image.

In the above description, the description was given of the case that the character area, the graphic area and the picture area are clipped automatically by the object separation unit 111 as the partial area displayed as the folded image. Other than this way, the area displayed as the folded image can be selected according to the operation of the operation unit (mouse) 204 by the user. For example, after the rectangle area is displayed on the image, the area displayed as the folded image can be selected by changing the size of this rectangle area according to the operation of the mouse.

Figure 11A:
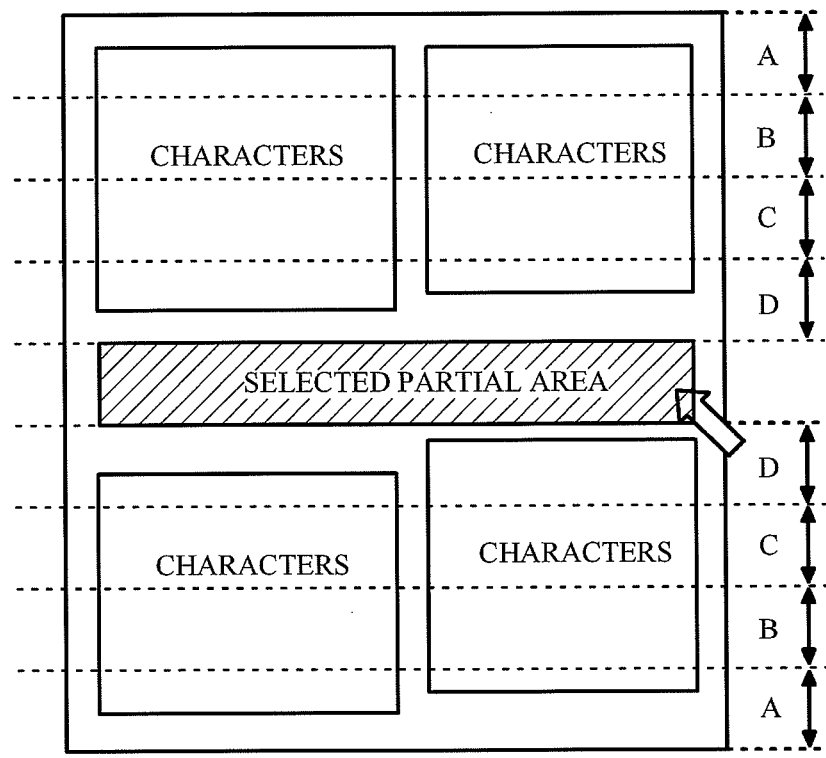
FIGS. 11A and 11B are diagrams for explaining a method of selecting a folded area when displaying a folded image by folding an image for one page.

Other than the method described with FIGS. 5A through 7B, there are methods of separating the image of one page and displaying the folded image by folding the separated images one by one. For example, as illustrated in FIG. 11A, the partial area according to position (point) indicated by the user is defined as a tentative selected area. The upper and lower sides areas of the tentative selected area are equally-divided into multiple areas respectively. The partial areas are folded in order of the increasing distance from the tentative selected area according to the operation to request folding the image by the user, and only the partial areas that are not folded at the time are displayed. In FIG. 11A, the upper and lower areas of the selected partial area are deleted (folded) in order of A, B, C and D as illustrated.

Figure 11B:
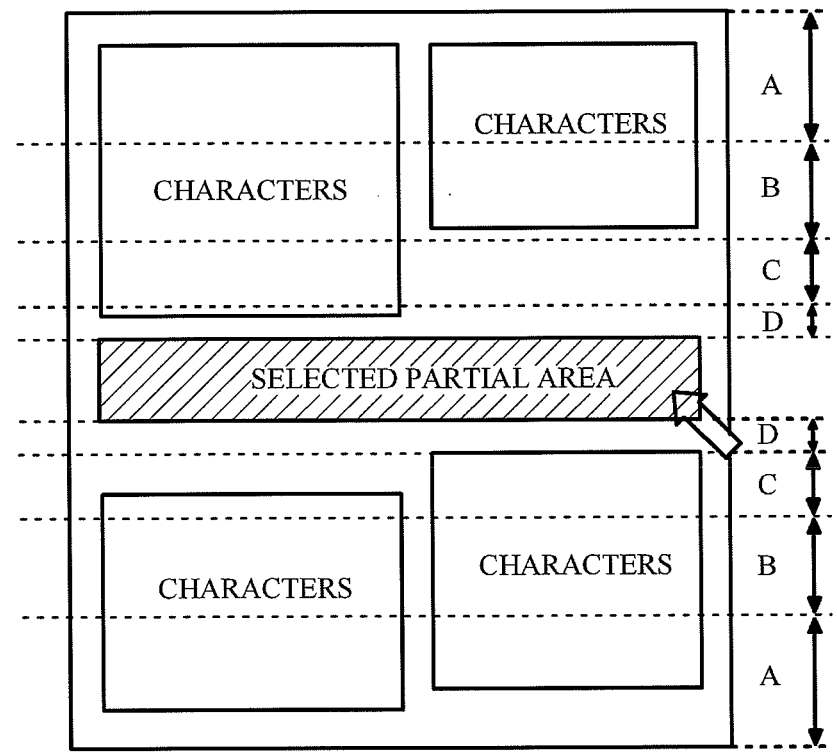

In FIG. 11B, the upper and lower areas of the tentative selected area which is set according to the position indicated by the user are separated into multiple areas. The size of the separated area increases with distance from the tentative selected area. In FIG. 11B, A is bigger than B, B is bigger than C, and C is bigger than D. The order of deleting (folding) image is same as FIG. 11A, which means order of A, B, C and D in accordance with the increasing distance from the selected partial area.

The description will now be given of the processing flow of the controller 100 with reference to the flowchart illustrated in FIG. 12.

When the controller 100 displays image data on the display 208 (step S1/YES), it determines whether the displayed image data includes the folded image data (step S2). When the controller 100 determines that the image data displayed on the display 208 does not include the folded image data (step S2/NO), it determines the range of the partial area included in image data being displayed, and stores the coordinate values indicating a range of each partial area in the RAM 103 (step S3). Then, the controller 100 determines whether the user selects the partial area of the image data being displayed on the display 208 (step S4). When the controller 100 determines that the user selects the partial area (step S4/YES), it determines which partial area the selected partial area is in the partial areas included in image data being displayed (step S5). When the controller 100 determines the selected partial area, it creates the folded image data where the area other than the selected partial area is deleted (folded) (step S6). Then, the controller 100 displays the created folded image data on the display 208 (step S7), and moves to the step S2. When the controller 100 determines that the folded image is included in the image data being displayed on the display 208 in step S2 (step S2/YES), it determines whether the operation input to change the display area of the folded image is received (step S8). When the operation input to change the display area is received (step S8/YES), the controller 100 determines the partial area that is selected by the received operation input and is newly displayed (step S9). When the controller 100 determines the partial area to be newly displayed, it creates the folded image data including the folded image data already being displayed on the display 208 and the image data of selected partial area (step S10). After the controller 100 creates the folded image data, it displays the created folded image data on the display 208 (step S11).

When the operation input by the user is not received in the step S4 or S8 (step S4/NO, or step S8/NO), the controller 100 determines whether the operation input to delete the image (including the folded image) being displayed on the display 208 (step S12) is received. When the operation input to delete the image is received (step S12/YES), the controller 100 ends this process. When the operation input to delete the image is not received 8 (step S12/NO), the controller 100 repeats the process from the step S2.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents. For example, in the above embodiment, the image data is separated into the character area, the graphic area and the picture area respectively. However, when graphics and pictures are surrounded by the characters, these characters may be the description for the graphics and pictures. Therefore, the image data can be divided into the area including characters and graphics, and the area including characters and pictures. In the above description, the exemplary embodiment is performed by the computer apparatus 1, but it can be performed by an image forming apparatus.

Figure 12:
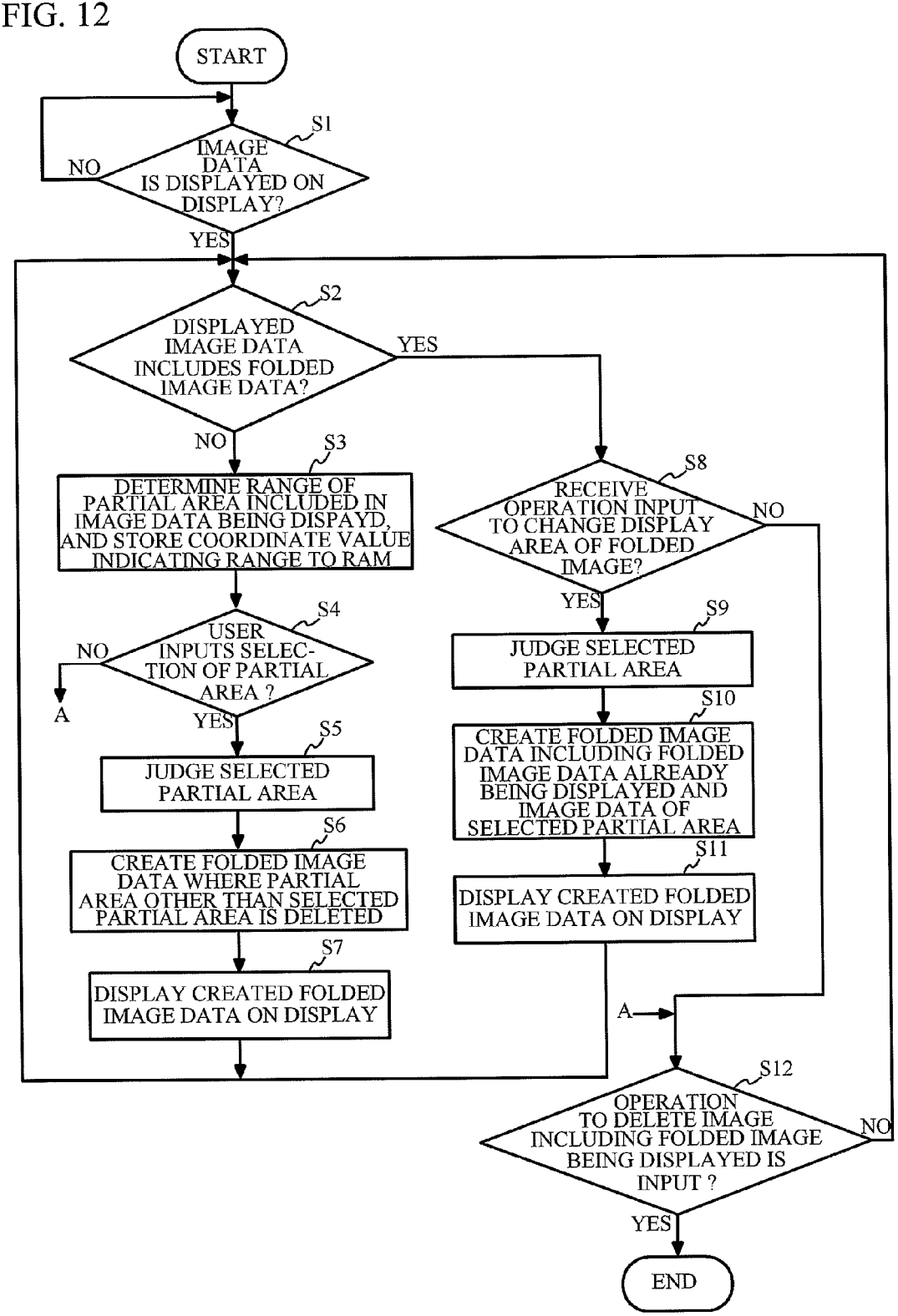
FIG. 12 is a flowchart illustrating a process of the controller.

The process illustrated in the flowchart of FIG. 12 is achieved by the program controlled computer. The program describing the contents of the processing can be provided through the computer readable medium.

What is claimed is:

1. An information display apparatus comprising at least one hardware processor which implements:
   an area separation unit that analyzes each page of pages included in an image data, determines whether at least one of character, graphic and picture is included in each page included in the image data, and separates each page included in the image data into each area of character, graphic and picture determined to be included;
   an operation input reception unit that receives an input of a position coordinate that is indicated through an operation unit that receives an operation to indicate an arbitrary position on a display screen;
   a judgment unit that, when the input of the position coordinate through the operation unit is received while one page included in the image data is being displayed on the display screen, judges which area is selected from areas included in the page being displayed on the display screen on the basis of the position coordinate that is received; and
   a display controller that hides an image of an area other than a first area which is determined to be selected by the judgment unit, and displays an image of the first area while maintaining a position of the first area and an image of a next page of the page being displayed in an area where the image of the area other than the first area is hidden simultaneously, wherein the display controller is configured to sequentially hide images of a plurality of areas, other than the first area, from among the areas included in the page being displayed, in response to a single input operation received to select the first area, wherein the display controller overlaps the image of the first area over the next page with the position of the image of the first area in the image data being maintained.

2. The information display apparatus according to claim 1, wherein in the case that areas of pages included in the image data are selected through the operation unit, and that an display area of a page of which page number is small and an display area of a page of which page number is large overlap, the image of the page of which page number is small is displayed on the overlapping area.

3. The information display apparatus according to claim 1, wherein in the case that the position coordinate received by the operation unit reception unit in a state where the image of the first area is being displayed indicates the first area, the display controller identifies a position on the first area on the basis of the position coordinate, and changes the state of the image of a surrounding area of the first area from a hidden state to a displayed state according to the position on the identified area.

4. A non-transitory computer readable medium causing a computer to execute a process, the process comprising:
analyzing each page of pages included in an image data;
determining whether at least one of character, graphic and picture is included in each page included in the image data;
separating each page included in the image into each area of character, graphic and picture determined to be included;
receiving an input of a position coordinate indicated through an operation unit that receives an operation to indicate an arbitrary position on a display screen;
judging which area is selected from areas included in the page being displayed on the display screen on the basis of the position coordinate that is received when the input of the position coordinate through the operation unit is received while one page included in the image data is being displayed on the display screen;
hiding an image of an area other than a first area which is determined to be selected in the judging; and
displaying an image of the first area while maintaining a position of the first area and an image of a next page of the page being displayed in the area where the image of the area other than the first area is hidden simultaneously,
wherein the hiding the image of the area comprises sequentially hiding images of a plurality of areas, other than the first area, from among the areas included in the page being displayed, in response to a single input operation received to select the first area,
wherein the displaying the image comprises overlapping the image of the first area over the next page with the position of the image of the first area in the image data being maintained.

5. An information display apparatus comprising at least one hardware processor which implements:
an area separation unit that separates a first page of image data that is displayed on a display screen into a plurality of areas;
an operation input reception unit that receives an input of a position coordinate that is indicated through an operation unit to indicate a position on the display screen;
a determination unit that determines which area of the plurality of areas is selected based on the position coordinate; and
a display controller that hides remaining portions of the first page other than the selected area to generate a folded image corresponding to the selected area, and displays an image of the selected area of the first page and portions of a next page corresponding to the hidden portions of the first page in an area of the hidden portions of the first page simultaneously while maintaining a position of the selected area,
wherein the display controller is configured to sequentially hide the remaining portions, other than the selected area, of the first page, in response to a single input operation received to select the area, and
wherein the display controller overlaps the image of the selected area over the next page with the position of the image of the selected area in the image data being maintained.

6. The information display apparatus according to claim 5, wherein:
the operation input reception unit receives an input indicated through the operation unit to expand an area of the folded image such that the folded image comprises the selected area and an expanded area; and
the display controller displays additional portions of the first image corresponding to an expanded area of the folded image, hides remaining portions of the first page other than the selected area and the expanded area, and displays portions of the next page corresponding to the hidden portions of the first page in an area of the hidden portions of the first page.

7. The information display apparatus according to claim 5, wherein, in the area in which the folded image and the image of the next page overlap, the folded image is displayed over the image of the next page.

8. The information display apparatus according to claim 1, wherein the display controller is configured to sequentially hide the images of a plurality of areas, other than the first area, from among the areas included in the page being displayed, in an order from increasing to decreasing distance to the first area.

9. The computer readable medium according to claim 4, wherein the sequentially hiding comprises sequentially hiding the images of the plurality of areas, other than the first area, from among the areas included in the page being displayed, in an order from increasing to decreasing distance to the first area.

10. The information display apparatus according to claim 5, wherein the display controller is configured to sequentially hide the remaining portions, other than the selected area, of the first page, in an order from increasing to decreasing distance to the selected area.

* * * * *